(12) United States Patent
Dubeyko et al.

(10) Patent No.: US 10,606,513 B2
(45) Date of Patent: Mar. 31, 2020

(54) VOLATILITY MANAGEMENT FOR NON-VOLATILE MEMORY DEVICE

(71) Applicant: Western Digital Technologies, Inc., San Jose, CA (US)

(72) Inventors: Viacheslav Dubeyko, San Jose, CA (US); Luis Cargnini, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/833,837

(22) Filed: Dec. 6, 2017

(65) Prior Publication Data

US 2019/0171391 A1    Jun. 6, 2019

(51) Int. Cl.
*G06F 12/02* (2006.01)
*G06F 3/06* (2006.01)

(52) U.S. Cl.
CPC ............ *G06F 3/0659* (2013.01); *G06F 3/065* (2013.01); *G06F 3/0619* (2013.01); *G06F 3/0644* (2013.01); *G06F 3/0688* (2013.01)

(58) Field of Classification Search
None
See application file for complete search history.

(56) References Cited

U.S. PATENT DOCUMENTS 5,680,570 A * 10/1997 Rantala .............. G06F 11/0796
                                                 711/104
6,560,674 B1  5/2003 Hosogi et al.
8,437,188 B2 * 5/2013 Kajigaya .............. G11C 14/00
                                                 365/185.08
9,081,660 B2  7/2015 Thomas
9,128,824 B2  9/2015 Gries et al.
2005/0169084 A1  8/2005 Matsui
2007/0053220 A1  3/2007 Gohou (Continued)

FOREIGN PATENT DOCUMENTS

EP              3293638 A1    3/2018

OTHER PUBLICATIONS

Dubeyko et al., co-pending U.S. Appl. No. 15/922,007, filed Mar. 15, 2018, entitled "Volatility Management for Memory Device".

(Continued)

*Primary Examiner* — Charles Rones
*Assistant Examiner* — Ryan Dare
(74) *Attorney, Agent, or Firm* — Barry IP Law, P.C.

(57) ABSTRACT

A Memory Device (MD) includes a configurable Non-Volatile Memory (NVM) including a first memory array and a second memory array. The configurable NVM stores temporary data designated for volatile storage by a Central Processing Unit (CPU) and persistent data designated for non-volatile storage by the CPU. An address is associated with a first location in the first memory array and with a second location in the second memory array. In performing a command to write data for the address, it is determined whether to write the data in the second location based on a volatility mode set for the MD. According to another aspect, a CPU designates a memory page in a virtual memory space as volatile or non-volatile based on data allocated to the memory page, and defines the volatility mode for the MD based on whether the memory page is designated as volatile or non-volatile.

25 Claims, 13 Drawing Sheets

(56) References Cited

U.S. PATENT DOCUMENTS

| | | |
|---|---|---|
| 2007/0174718 A1 | 7/2007 | Fouquet-Lapar |
| 2010/0115204 A1 | 5/2010 | Li et al. |
| 2011/0113208 A1 | 5/2011 | Jouppi et al. |
| 2013/0332660 A1 | 12/2013 | Talagala et al. |
| 2014/0006686 A1 | 1/2014 | Chen et al. |
| 2014/0281269 A1 | 9/2014 | Chakrabarti et al. |
| 2015/0162063 A1 | 6/2015 | Mueller |
| 2015/0178164 A1 | 6/2015 | Zhang |
| 2015/0206574 A1 | 7/2015 | Greathouse et al. |
| 2015/0331624 A1 | 11/2015 | Law |
| 2016/0034225 A1 | 2/2016 | Yoon et al. |
| 2016/0170645 A1 | 6/2016 | Kumar et al. |
| 2017/0212687 A1 | 7/2017 | Kelly et al. |
| 2018/0329818 A1* | 11/2018 | Cheng ................. G06F 12/0804 |

OTHER PUBLICATIONS

Written Opinion dated Apr. 17, 2019 from International Application No. PCT/US2018/067121, 6 pages.

* cited by examiner

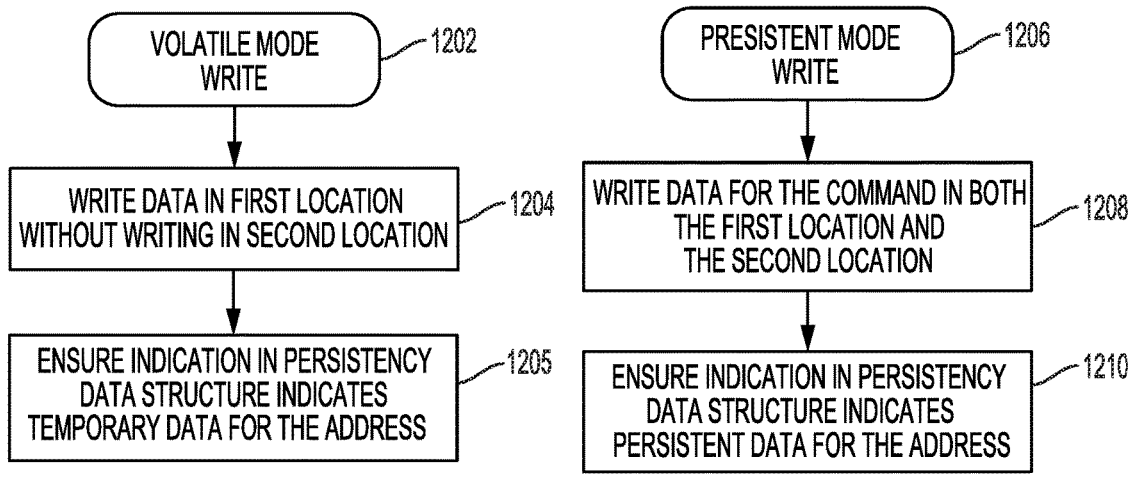
FIG. 12A
FIG. 12B
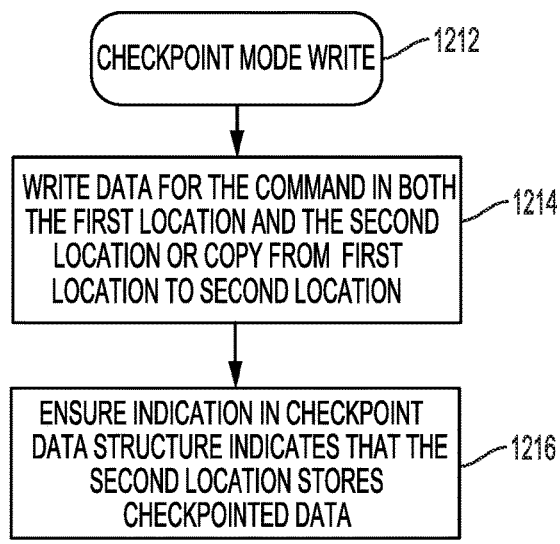
FIG. 12C

VOLATILITY MANAGEMENT FOR NON-VOLATILE MEMORY DEVICE

BACKGROUND

Conventional memory architecture generally distinguishes between two types of memory. The first type of memory is volatile memory that can only store data while power is supplied to the memory. The second type of memory is Non-Volatile Memory (NVM) that retains data without being powered. NVM is typically considered to take longer to read and write data than volatile memory. Persistently stored data is conventionally transferred from NVM to volatile memory to perform operations on the data. The modified data or other resulting data is then transferred or flushed back to the NVM to be persistently stored.

In the example of an Operating System (OS), a volatile memory such as a Dynamic Random Access Memory (DRAM) may be used by the OS when executing a process or a thread, such as a subset of instructions in a process. The OS may create a byte-addressable, virtual address space that maps to locations in the DRAM for receiving data from files stored in the NVM. The data can be copied to memory pages of a fixed size in the address space that is accessed by a processor, such as a Central Processing Unit (CPU).

New and developing NVM technologies, such as Magnetoresistive RAM (MRAM), 3D XPoint, or Resistive RAM (RRAM), have been recently proposed that can provide faster access times for reading and writing data as compared to previous NVM technologies such as flash memory or magnetic hard disks. However, computer architecture in terms of software and hardware generally depends on the principle described above of loading data from an NVM into a volatile memory for a processor to access the data, and then flushing certain processed or transformed data back to the NVM if needed for persistent storage. Such operation may conflict with using an NVM that persistently stores data that is otherwise considered to be volatile by the system. In this regard, conventional systems may rely on volatile memory for many functions, such as to provide a byte-addressable memory space for accessing portions of data loaded from a full page of flash memory or from a whole sector of a disk, to provide faster access to data that has been loaded in the volatile memory, to perform operations related to data reliability and error correction, or to ensure that data is not persistently stored for security reasons. The replacement of volatile memory with developing NVM technologies therefore presents new data management concerns for data that is assumed by the system to be volatilely stored.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 12A is a flowchart for a volatile mode write process of an MD according to an embodiment.

FIG. 12B is a flowchart for a persistent mode write process of an MD according to an embodiment.

FIG. 12C is a flowchart for a checkpoint mode write process of an MD according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Overview

Figure 1:
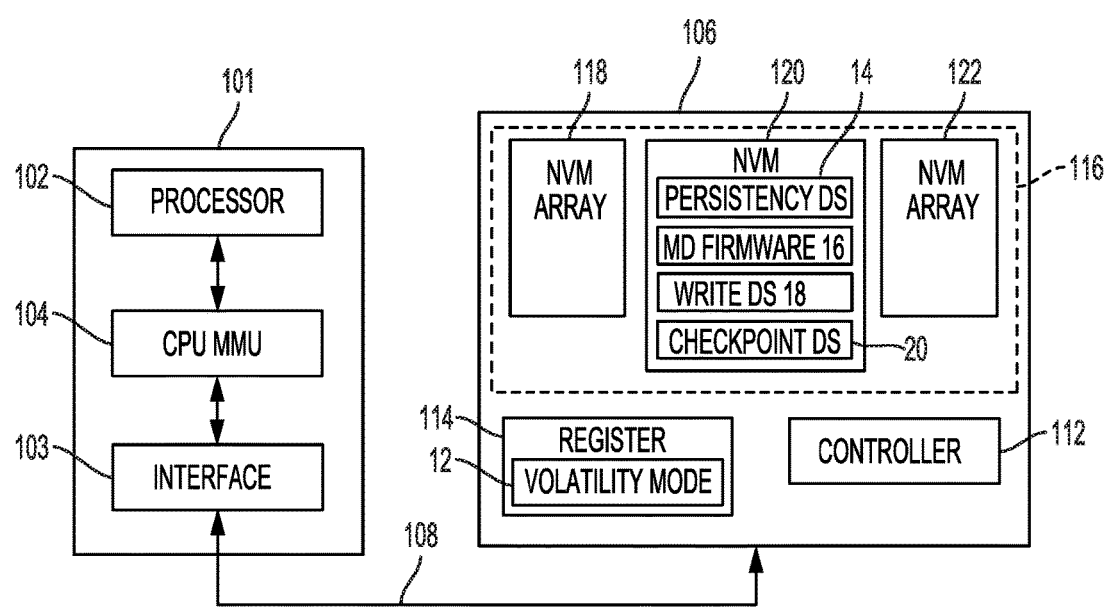
FIG. 1 is a block diagram of a Central Processing Unit (CPU) and a Memory Device (MD) according to an embodiment.

FIG. 1 is a block diagram of Central Processing Unit (CPU) 101 and Memory Device (MD) 106 according to an embodiment. CPU 101 can include, for example, a CPU casing, a System on a Chip (SoC), a Microprocessor (MPU), or a Microcontroller (MCU). The example of CPU 101 in FIG. 1 includes processor 102, interface 103, and CPU Memory Management Unit (MMU) 104. Processor 102 performs operations on data accessed from MD 106. As will be appreciated by those of ordinary skill in the art, processor 102 can include an Arithmetic Logic Unit (ALU) for performing operations, registers for storing instructions and results from the operations, and one or more caches (e.g., L1, L2, and L3 cache levels) for storing data used by the ALU. MMU 104 translates virtual addresses used by processor 102 into physical addresses (e.g., byte addresses) indicating a location of where data for the virtual addresses are to be stored in or retrieved from MD 106. Interface 103 allows CPU 101 to communicate with MD 106 via bus 108.

As shown in FIG. 1, CPU 101 does not include a volatile Dynamic Random-Access Memory (DRAM) as a main memory. Instead, CPU 101 uses a portion of configurable Non-Volatile Memory (NVM) 116 of MD 106 as a main memory. As discussed in more detail below, configurable NVM 116 is configured to store temporary data designated for volatile storage by CPU 101 and persistent data designated for non-volatile storage by CPU 101. In this sense, configurable NVM 116 can be considered a "fuzzy NVM" by providing both temporary and persistent data storage functions.

As shown in FIG. 1, MD 106 includes controller 112, register 114, and configurable NVM 116. Controller 112 can include circuitry for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, controller 112 can include an SoC. As discussed in more detail below, controller 112 serves as a MMU for MD 106 by determining whether to access data from NVM array 118 and/or NVM array 122 of configurable NVM 116 based on a volatility mode set for MD 106.

Register 114 can include, for example, a Magnetoresistive RAM (MRAM) or another type of relatively quick access memory, such as Static RAM (SRAM). In some implementations, register 114 may include a set of registers. Those of ordinary skill in the art will understand that register 114 and controller 112 may be combined as a single component in some implementations. In the example of FIG. 1, register 114 stores volatility mode 12 as a data structure that indicates a current volatility mode of operation for MD 106. The state of volatility mode 12 can affect how MD 106 accesses data in configurable NVM 116. In other implementations, volatility mode 12 may be stored in a portion of configurable NVM 116, such as NVM 120. As discussed in more detail below with the data access examples of FIGS. 4 to 12C, CPU 101 or another device external to MD 106 can set volatility mode 12 to affect how data is stored in NVM array 118 and/or NVM array 122 in configurable NVM 116.

In the example of FIG. 1, configurable NVM 116 includes NVM array 118 and NVM array 122. As discussed in more detail below, controller 112 of configurable NVM 116 can store data that CPU 101 considers or expects to be temporarily used in NVM array 118. NVM arrays 118 and 122 can include a Storage Class Memory (SCM) or other type of NVM that can be accessed quickly for read and write operations as compared to more conventional types of NVM, such as Hard Disk Drives (HDDs) or flash memory. As discussed in more detail below, the relatively fast access of NVM arrays 118 and 122, combined with the volatility management processes disclosed below, ordinarily allow for an efficient use of configurable NVM 116.

The type of NVM or NVM technology (e.g., MRAM or ReRAM) for NVM array 118 and NVM array 122 may be the same or may be different. For example, NVM array 118 may include an NVM technology or NVM type that can be accessed quicker and/or has a greater endurance for storing temporary data than an NVM type used for NVM array 122 to store persistent or checkpointed data. In this regard, the temporary data stored in NVM array 118 may be written more often or need to be accessed more quickly than the persistent or checkpointed data stored in NVM array 122. As another example, NVM array 122 may include an NVM type that has a lower Bit Error Rate (BER) for storing persistent or checkpointed data.

Configurable NVM 116 also includes NVM 120, which can include a reserved portion of configurable NVM 116 for non-volatilely storing persistency data structure 14, MD firmware 16, and checkpoint data structure 20 across power cycles of MD 106. Persistency data structure 14 can indicate whether the data stored for a particular address or group of addresses is considered persistent. In some implementations, persistency data structure 14 can include a bitmap associating addresses with a binary value indicating whether data for the address is persistent. In addition, persistency data structure 14 may have different address granularities in different implementations. For example, some implementations may indicate whether a given byte address is considered persistent, while other implementations may indicate whether a group of contiguous byte addresses, such as for a memory page, is considered persistent. As used herein, the term address is understood to pertain to either a single address or a group of contiguous addresses.

NVM 120 is also shown in FIG. 1 as storing write data structure 18. Write data structure 18 can indicate which addresses have been written since a power-up of MD 106. As discussed in more detail below, write data structure 18 may be used to determine whether predetermined data, such as zeroed data, or data stored in NVM array 118 is returned for a read command for certain volatility modes of MD 106. Write data structure 18 can include, for example, a bitmap associating addresses with a binary value to indicate whether data has been written for the address since power-up. In some implementations, write data structure 18 can be erased or reset during an initialization process of configurable NVM 116 after MD 106 powers-up. In other implementations, write data structure 18 may be stored in a volatile memory, such as SRAM, so that it is erased after MD 106 is powered off.

Checkpoint data structure 20 can indicate whether checkpointed data has been stored in NVM array 122 for different addresses. As discussed in more detail below, checkpoint data structure 20 may be used to determine whether to return data from NVM array 122 in performing a command to obtain checkpointed data. Checkpoint data structure 20 can include, for example, a bitmap associating addresses with a binary value to indicate whether data has been checkpointed for the address. As with persistency data structure 14, checkpoint data structure 20 is maintained across power cycles of MD 106.

In the example of FIG. 1, NVM 120 also stores MD firmware 16 that can include computer-executable instructions for operating MD 106. Controller 112 accesses MD firmware 16 or portions of MD firmware 16 for execution when performing data access operations, such as in FIGS. 10 to 12C.

Figure 2A:
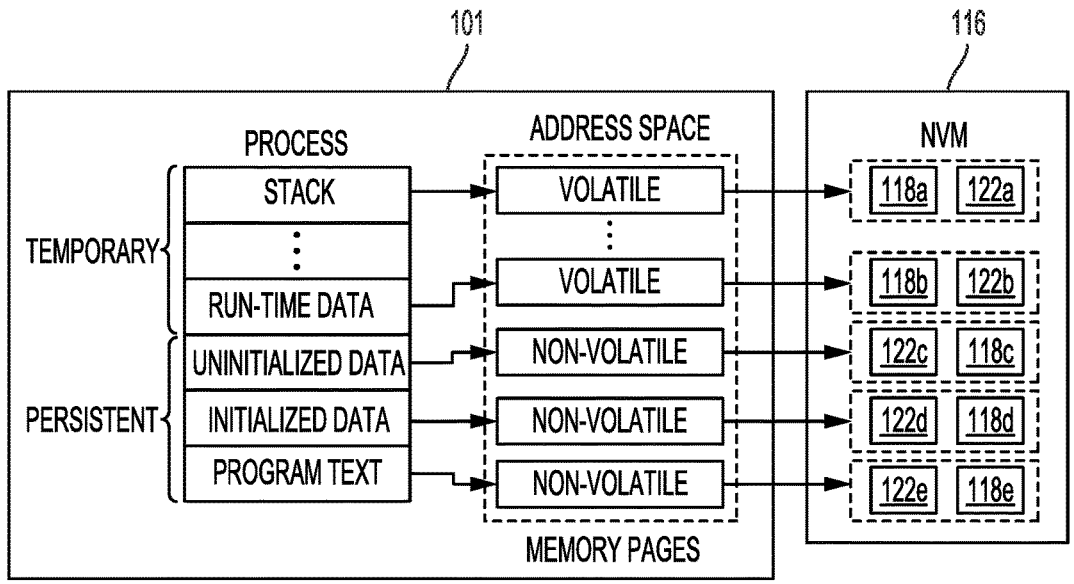
FIG. 2A illustrates the access of memory pages by a process or a thread that designates the memory pages as volatile or non-volatile according to an embodiment.

FIG. 2A illustrates the allocation of memory pages for a process or a thread executed by processor 102 that designates the memory pages as volatile or non-volatile according to an embodiment. The process or thread can be run as part of an application, such as an Operating System (OS), or other user-space application. The OS allocates virtual addresses to be used by the process when executing functions for the process or thread. In allocating the virtual addresses, the OS creates a virtual address space including memory pages that are byte addressable. As will be appreciated by those of ordinary skill in the art, a task scheduler of the OS may allow processor 102 to concurrently execute multiple processes each with their own process stack by distributing time slices or quanta among the processes. In addition, multi-core implementations of CPU 101 may include multiple processing units for parallel processing.

As shown in FIG. 2A, the process designates data for volatile or non-volatile storage. Although conventional systems typically use a volatile memory such as a Dynamic RAM (DRAM) for temporarily storing data, the present disclosure allows CPU 101 to access MD 106 more directly without an intermediate volatile memory between MD 106 and CPU 101 by maintaining a designation between data that is considered by the processes executed by processor 102 as temporary, and data that is considered persistent. This ordinarily allows for the use of faster SCMs in place of a DRAM or other main memory without significantly altering the configuration or operation of processor 102. The use of NVM in place of a volatile memory, such as DRAM, can also ordinarily reduce a power consumption of the system by not needing to refresh the NVM to retain temporary data. The volatility management discussed below therefore provides a more compact, cost effective, and efficient memory management system than conventional memory management systems since MD 106 stores data considered by CPU 101 as persistent and designated for non-volatile storage (e.g., data generated as a result of an algorithm), in addition to data that is considered by CPU 101 as temporary (e.g., run-time data) and designated for volatile storage.

In the example of FIG. 2A, data that is considered temporary includes run-time data, such as local variables that are modified during execution of a function, and data that is considered persistent includes uninitialized and initialized data, and program text that may be accessed from NVM, such as from files stored in configurable NVM 116 or from another NVM. In some cases, the program text loaded from another NVM, such as from an external storage device, may be retained as persistent data in configurable NVM 116 for reuse of the program text from a location closer to CPU 101. Although the example of FIG. 2A shows the program text as persistent data, other examples may include program text identified as temporary data by the process, such as, for example, certain dynamic libraries loaded during execution of the process after creation of the process.

Figure 2B:
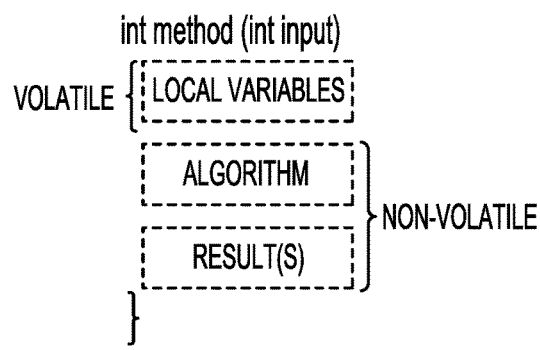
FIG. 2B provides an example of temporary and persistent data that may be used with a function performed by the process or thread of FIG. 2A.

FIG. 2B provides an example of a function that uses data designated for volatile storage (i.e., temporary data) and data designated for non-volatile storage (i.e., persistent data) by the process of FIG. 2A. The example "method" function in FIG. 2B includes one or more integer input variables, "int input", that are designated for volatile storage as local variables in the run-time data of the process stack. The function of FIG. 2B also includes an algorithm or code for the function, and after execution, returns one or more results. As shown in FIG. 2B, the process can identify the local variables as temporary run-time data designated for volatile storage, and identify the algorithm and certain results as persistent data designated for non-volatile storage. In some cases, other results may be returned to the stack as temporary data designated for volatile storage, such as when the results are intermediary results to be further modified by the process. The process or thread in FIG. 2A may also more randomly access other data from MD 106, such as an input value, using a heap memory structure, rather than the memory stack structure as described above.

In FIG. 2A, the process or thread executed by processor 102 may request the allocation of non-volatile memory pages in the address space for data that is considered persistent or non-volatilely stored, such as certain results returned by the function. The process or thread may also request the allocation of volatile memory pages for other data that is considered temporary or volatilely stored, such as for run-time data. In this regard, the process or thread executing the function and designating whether the memory pages are considered volatile or non-volatile has intrinsic knowledge about the temporary or persistent state of the data allocated to the memory pages. In addition, a compiler executed by processor 102 may also designate memory pages as volatile or non-volatile during compilation. As the process or thread executes the function, temporary run-time data, such as one or more local variables or intermediate results, is generated and designated for volatile memory pages by the process or thread in the virtual address space. The process or thread in the present disclosure can designate whether the memory pages are allocated to temporary or persistent data using, for example, a volatility flag or a special instruction that can be used by CPU 101 when forming a command to be sent to MD 106.

As discussed in more detail below, CPU 101 sends read and write commands to MD 106 to access the data for the allocated memory pages from NVM array 118 and/or 122 depending on a volatility mode of operation for MD 106 that can be set by CPU 101. CPU 101 can define a volatility mode of operation for MD 106 based on whether a memory page is designated as volatile or non-volatile, and then set the defined volatility mode of operation for MD 106 by sending a separate volatility mode command to MD 106, or by including an indication of the volatility mode with a read or write command.

Figure 3:
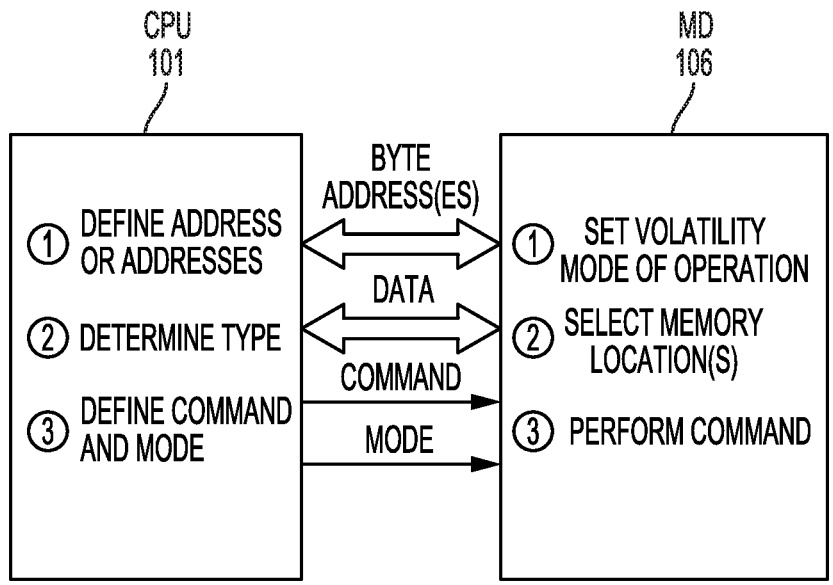
FIG. 3 illustrates communication between CPU and an MD in reading and writing data according to an embodiment.

FIG. 3 illustrates communication between CPU 101 and MD 106 for reading data from configurable NVM 116 and writing data to configurable NVM 116 according to an embodiment. Instructions executed by processor 102 of CPU 101 define virtual addresses for data and determine a volatility type for the data, which can include determining whether the data to be stored or retrieved for the virtual addresses is considered temporary or persistent by a process or thread executed by processor 102. MMU 104 of CPU 101 converts the virtual addresses to define physical byte addresses for the data, and may use flags or another indicator set by the process or thread for each memory page indicating whether the memory page for the data has been designated as a volatile or non-volatile memory page.

CPU 101 also defines the type of command, such as whether the data associated with the address or addresses is to be retrieved from configurable NVM 116 of MD 106 with a command to read data, or written in configurable NVM 116 with a command to write data. For commands to write data, the command can include, for example, a store command, a move command (e.g., mov command) to move data from CPU 101 to MD 106, or another write command type. The write command can include the data to be stored in configurable NVM 116, and the associated byte address or addresses for storing the data. For a command to read data, the command can include, for example, a move command (e.g., mov command) to move data from MD 106 to CPU 101 or another read command type, and the associated byte address or addresses for retrieving the requested data.

In some implementations, CPU 101 can include a flag or other indication, such as a special type of write command, for setting a volatility mode for the command based on whether the data for the command is allocated to a memory page or memory pages that have been designated as volatile or non-volatile. In other implementations, the volatility mode may be sent separately from a read or write command, or may be provided with a first command to set the volatility mode for the first command and one or more commands following the first command.

MD 106 receives the commands from CPU 101 via bus 108, and controller 112 accesses NVM array 118 and/or NVM array 122 based on volatility mode 12 set in register 114, or based on a special write command indicating whether the data to be written for the command is considered persistent or volatile. The determination of whether to access NVM array 118 and/or NVM array 122 may not be visible or otherwise apparent to CPU 101, since this determination and the resulting access of NVM array 118 and/or NVM array 122 is handled by controller 112.

In the case where CPU 101 sends a setting for the volatility mode, controller 112 can set a value in register 114 for volatility mode 12 corresponding to one of a volatile mode, a persistent mode, or a checkpoint mode. After starting up or when initializing configurable NVM 116, controller 112 can initially set a null mode by executing MD firmware 16, so that data read before the volatility mode is retrieved based on an indication in persistency data structure 14 indicating whether data for the address is considered persistent or temporary. Example read and write operations for the null mode, volatile mode, persistent mode, and checkpoint mode are discussed in more detail below with reference to FIGS. 5 to 9C. In addition, some systems may include other devices or components other than CPU 101, such as another CPU or processor, that similarly access configurable NVM 116 and can set a volatility mode for MD 106.

As shown in FIG. 3, the volatility mode of operation is set in register 114, and controller 112 selects one or more memory locations in NVM array 118 and/or NVM array 122 based on the set volatility mode. In some implementations, each address has a first memory location in NVM array 118 corresponding to data for the address that is treated as, or considered to be temporary, and a second memory location in NVM array 122 corresponding to data for the same address that is treated as, or considered to be persistent or checkpointed. Persistency data structure 14 can include the addresses and an indication of whether the data for each address is considered persistent in configurable NVM 116. In other implementations, persistency data structure 14 can use indexes instead of addresses, since persistency data structure can serve as a static bit map based on the capacity of one of the arrays. The index in persistency data structure 14 for an address can then be calculated from the address.

Depending on the volatility mode set for MD 106, controller 112 may reference persistency data structure 14 to determine for a received write command whether to write data for the command at the first memory location in NVM array 118 and/or at the second memory location in NVM array 122. In some volatility modes, such as the volatile mode, controller 112 may reference write data structure 18 to determine for a received read command whether to access data for the command at the first memory location in NVM array 118 or to return predetermined data, such as zeroed data. In addition, controller 112 in the checkpoint mode may reference checkpoint data structure 20 to determine whether to read data for a checkpoint read command from the second memory location in NVM array 122.

Unlike volatility mode 12 and write data structure 18, which may or may not be stored in a volatile memory such as an SRAM, persistency data structure 14 and checkpoint data structure 20 are stored in an NVM to persist across power cycles of MD 106. In the example of FIG. 1, persistency data structure 14 and checkpoint data structure 20 are stored in NVM 120, which is a reserved area of configurable NVM 116. Other implementations may store persistency data structure 14 or checkpoint data structure 20 in a different NVM of MD 106.

After determining the memory location or locations for performing the command, controller 112 performs the command by reading or writing data at the determined memory location or locations. A confirmation of the performance of a write command, or the data requested by a read command, can also be sent back to CPU 101 via bus 108.

The use of two NVM arrays in configurable NVM 116, together with the setting of a volatility mode of operation for MD 106, ordinarily allows for a more efficient and cost-effective memory architecture. In this regard, an NVM array used as a quasi-volatile memory to store data considered temporary can replace one or more volatile intermediate memories (e.g., DRAM) to decrease the number of levels or layers of volatile memory typically found in current memory management systems.

NVM Access Examples

Figure 4:
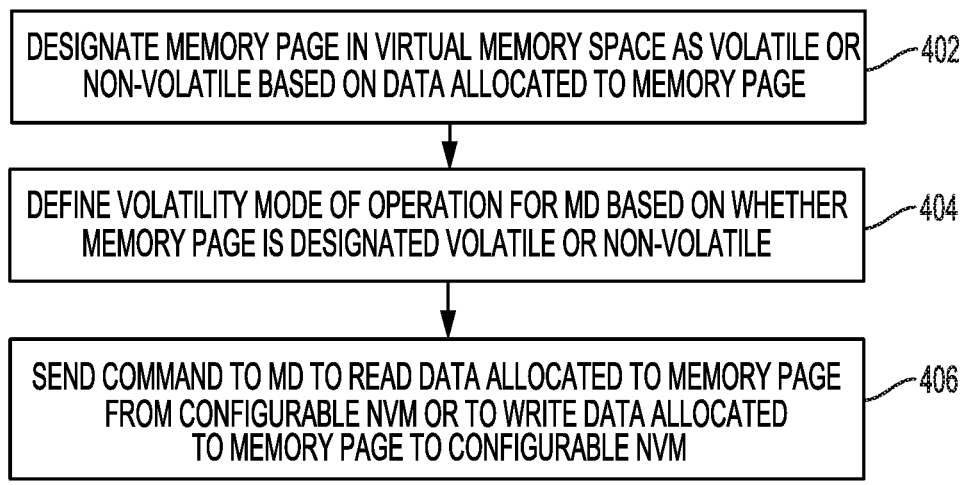
FIG. 4 is a flowchart for a data access process of a CPU according to an embodiment.

FIG. 4 is a flowchart for a data access process that can be executed by CPU 101 according to an embodiment. In block 402, processor 102 of CPU 101 designates a memory page in a virtual memory space as volatile or non-volatile based on the data allocated to the memory page. As discussed above with reference to FIGS. 2A and 2B, a process or thread of an application executed by processor 102 can determine whether data allocated to the memory page is considered temporary data, such as local variables or other run-time data that should be considered erased after deallocation or overwriting of the memory page. The process or thread can alternatively or additionally determine whether the data allocated to the memory page is considered persistent data, such as results from a function that should be kept persistent after the memory page is deallocated or overwritten. As discussed above, the designation of whether a memory page is volatile or non-volatile can be made using a flag or other indication such as a special instruction that can be used by CPU 101 in forming a command for MD 106.

In block 404, CPU 101 defines a volatility mode of operation for MD 106 based on whether the memory page or pages for the data are designated as volatile or non-volatile. CPU 101 may also send a volatility mode setting to MD 106 in block 404 or may send the volatility mode setting with a command sent in block 406.

In block 406, CPU 101 sends a command to MD 106 to access data in configurable NVM 116 that is allocated to the memory page or memory pages. The command may include, for example, a write command (e.g., a store command or a move command to move data from CPU 101 to MD 106) to modify or store temporary data allocated to a volatile memory page, a read command (e.g., a move command to move data from MD 106 to CPU 101) to read temporary data allocated to a volatile memory page, a write command to modify or store persistent data allocated to a non-volatile memory page, or a read command to read persistent data allocated to a non-volatile memory page. In addition, the command in block 406 may include a write checkpoint command to checkpoint or copy data allocated to a volatile memory page, a read checkpoint command (e.g., get checkpoint command) to retrieve checkpointed data from configurable NVM 116, or a checkpoint rollback command to overwrite temporary data with previously checkpointed data. As noted above, the command can include a command type and an address or addresses for the data. In some cases, the address may include a range of addresses, such as a starting address and an extent or length for the data to be accessed, or an ending address.

As noted above, the volatility mode setting for MD 106 may also be included with the command sent in block 406. In some implementations, CPU 101 may provide a single volatility mode setting in a first command sent to MD 106 for one or more commands that are sent to MD 106 after the first command. In this regard, the setting of a volatility mode may precede or be concurrent with the sending of a command in block 406 in some cases.

Figure 5:
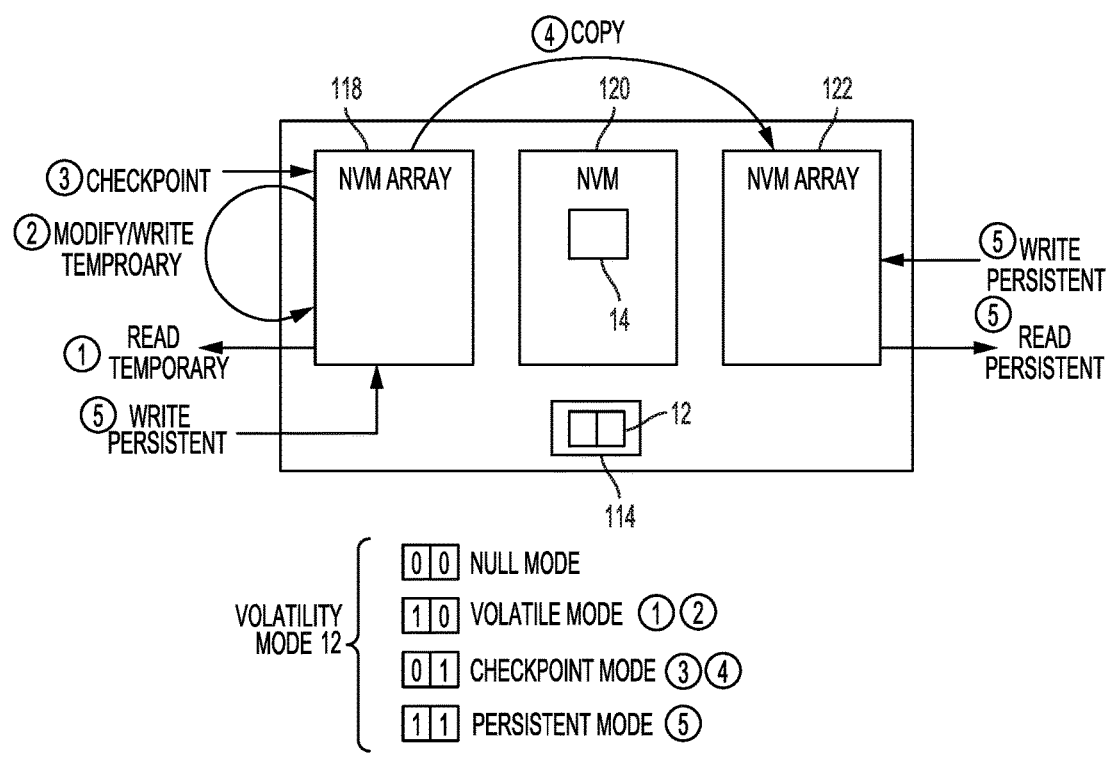
FIG. 5 illustrates an example series of operations performed in an MD including two Non-Volatile Memory (NVM) arrays when using a volatility mode of operation according to an embodiment.

FIG. 5 provides an example series of operations performed in configurable NVM 116 of MD 106 where a process of CPU 101 executes a function to modify temporary data associated with an address, and then checkpoints the modified data. The temporary data is further modified, before writing the further modified data as persistent data, which is subsequently read by CPU 101.

As shown in FIG. 5, register 114 stores a data structure that indicates a current volatility mode of MD 106. The example of FIG. 5 starts with a command from CPU 101 to read data for an address. Controller 112 of MD 106 checks persistency data structure 14 to determine whether data for the address is persistent or temporary. In the example of FIG. 5, the data for the address is considered temporary, so write data structure 18 is then checked to determine whether data for the address has been written since powering-up MD 106. Since data has been previously written, controller 112 retrieves the data from a first location for the address in NVM array 118.

A separate command or a write command sent by CPU 101 can set the volatility mode of operation for MD 106 to a volatile mode. The volatility mode in some cases can allow CPU 101 to use NVM array 118 as a scratch area for performing operations to modify run-time data. After receiving the command for the volatility mode from CPU 101, controller 112 sets a value of "10" for volatility mode 12 in register 114, corresponding to the volatile mode of operation.

CPU 101 sends a write command while MD 106 is in the volatile mode to modify the temporary data for the address. Controller 112 then ensures that persistency data structure 14 indicates that the data stored for the address is not considered persistent. In some implementations, persistency data structure 14 can include a bitmap associating addresses with a "1" value indicating that data stored for the address is considered persistent, and a "0" value indicating that the data for the address is considered volatile. Those of ordinary skill in the art will appreciate that other data structures or ways of tracking a persistency status of data are possible. In some cases, ensuring that the persistency data structure 14 indicates that the data is not considered persistent includes changing or setting a value in persistency data structure 14 to a different value, such as from a "1" to a "0". In other cases, the indication in persistency data structure 14 may already indicate that the data is not considered persistent, and the persistency status for the address is maintained.

After the write command is performed in the volatile mode, CPU 101 can set the volatility mode for MD 106 to the checkpoint mode by sending a checkpoint command to MD 106. In the example shown in FIG. 5, CPU 101 sends a checkpoint command to MD 106. In response, controller 112 copies the data stored in the first location for the address in NVM array 118 to a second location in NVM array 122 to checkpoint the data for the address. Controller 112 also updates checkpoint data structure 20 to ensure that it indicates that NVM array 122 now stores checkpointed data for the address.

In some cases, the checkpointed data stored in NVM array 122 may include a timestamp or other indication of when the data was checkpointed to NVM array 122. In other implementations, NVM array 122 may only store a single checkpoint for a previous state of the data without a timestamp or indication of when the data was checkpointed. The checkpointed data stored in NVM array 122 can allow data for the address to be modified or written in the first location in NVM 118, while retaining the earlier checkpointed data in the second location in NVM 122. Such checkpointed data can be used, for example, to recover the earlier state of the data in the event of an error or other need to roll-back the data to its earlier state.

CPU 101 may then further modify the data stored in the first memory location in NVM array 118. In some implementations, CPU 101 may set MD 106 back to the volatile mode for such modifications of temporary data, or may keep MD 106 in the checkpoint mode. In this regard, some implementations may not include a separate checkpoint mode, and may instead use special checkpoint commands while MD 106 is in the volatile mode to write or read checkpoint data in the second location in NVM array 122.

Further modifications are made to the data stored in the first location in NVM array 118 with one or more write commands in the volatile mode, before CPU 101 sets the volatility mode to the persistent mode (i.e., a value of "11" for volatility mode 12 in register 114), and writes data for the address in both the first location in NVM array 118 and in the second location in NVM array 122. Controller 112 also sets or updates the persistency status for the address in persistency data structure 14, and resets the checkpoint status for the address in checkpoint data structure 20 to indicate that the second location in NVM array 122 no longer stores checkpointed data for the address.

CPU 101 may later read the persistent data from NVM array 122, as shown in FIG. 5, with a read command to MD 106 that controller 112 directs to the second location in NVM array 122 after checking the state of persistency data structure 14 for the address. In other implementations, controller 112 may instead access the persistent data from the first location in NVM array 118 since both the first and second locations should store the same data when the data is persistent.

Although a particular sequence of operations has been described for FIG. 5, those of ordinary skill in the art will appreciate that a different order of commands or sequence of operations can be used when accessing data stored in configurable NVM 116. For example, FIGS. 6 to 12C discussed below provide a variety of different operations for read and write commands in different volatility modes of operation. In addition, different values can be used in volatility mode 12 to set a volatility mode than those shown in FIG. 5.

Figure 6:
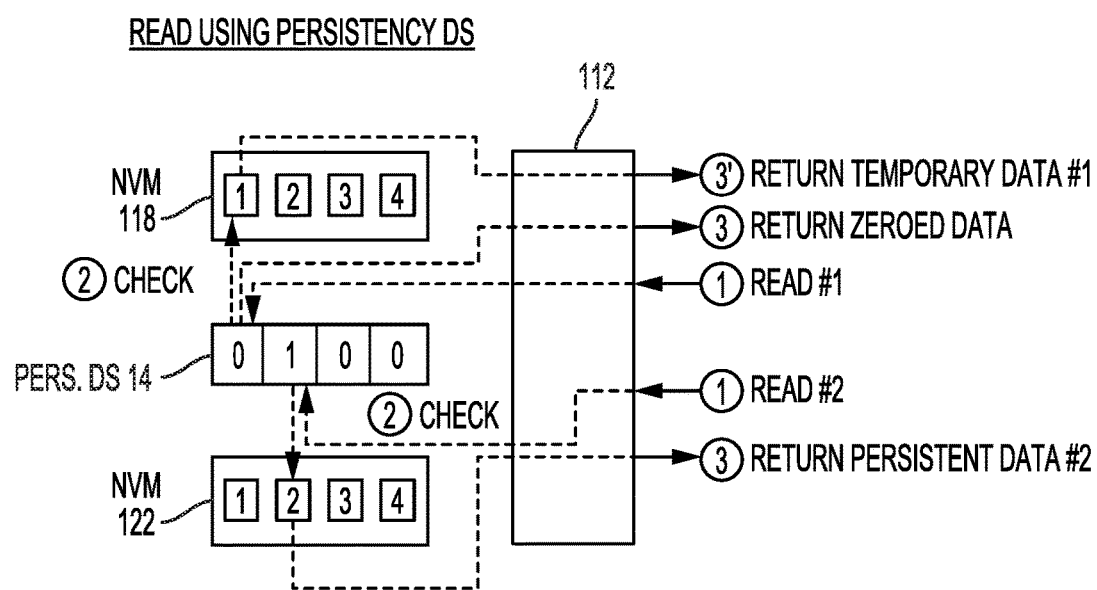
FIG. 6 depicts example read operations using a persistency data structure according to an embodiment.

FIG. 6 depicts example read operations in MD 106 using persistency data structure 14 according to an embodiment. As discussed above, controller 112 may initially set the volatility mode for MD 106 to a null mode after MD 106 powers-up. In the null mode, data written to configurable NVM 116 can be accessed depending on a predetermined default mode. For example, data written in the null mode may be treated the same as in the volatile mode by writing the data to only a first memory location in NVM array 118. Controller 112 may also set the volatility mode from the null mode to the default mode (e.g., the volatile mode or the persistent mode) after receiving a first write command in the null mode. In examples where the default mode is the persistent mode, a write command received in the null mode will be treated the same as in the persistent mode by writing the data to both the first memory location in NVM array 118 and to the second memory location in NVM array 122.

For read commands during the null mode, an address in persistency data structure 14 that is indicated as storing persistent data (e.g., a value of "1" in persistency data structure 14) returns data considered persistent from NVM array 122. On the other hand, if the address is indicated as not storing persistent data, MD 106 can return predetermined data, such as zeroed data that includes a series of zero values. Zeroed data may be returned for read commands in the null mode for addresses that are not indicated as storing persistent data and that have not been written to since a last power-up of MD 106, until a write command is received or the volatility mode is set by CPU 101. Controller 112 may determine whether an address has been written since a last power-up using write data structure 18.

In the example of FIG. 6, a read command is received for address #1 when volatility mode 12 in register 114 is set to a null mode, volatile mode, or persistent mode. Address #1 is checked in persistency data structure 14 to determine if the data stored in NVM array 122 for address #1 is considered persistent. Since persistency data structure 14 for address #1 indicates that the data for address #1 in NVM array 122 is not considered persistent (i.e., a value of "0"), zeroed data or temporary data stored in NVM array 118 for address #1 is returned to CPU 101 depending on whether write data structure 18 indicates that address #1 has been written since a last power-up. In this regard, data stored in NVM array 118 may be returned for read commands for addresses that are indicated as having been written since the last power-up. In returning zeroed data, controller 112 may determine that the address has not been written since the last power-up and then erase the data stored in NVM array 118 at that time, before allowing access to the first location for the address in NVM array 118. Other implementations may alternatively erase all data stored in NVM array 118 during an initialization of configurable NVM 116 after powering-up MD 106 to reset NVM array 118, so that zeroed data is returned for data that has not been written since the last power-up.

In contrast, a read command is received for address #2, and persistency data structure 14 is checked for the persistency status of the data stored for address #2. Since persistency data structure 14 indicates that the data for address #2 is considered persistent, the second location for address #2 is read in NVM array 122, and MD 106 returns the data read from the second memory location to CPU 101.

Figure 7A:
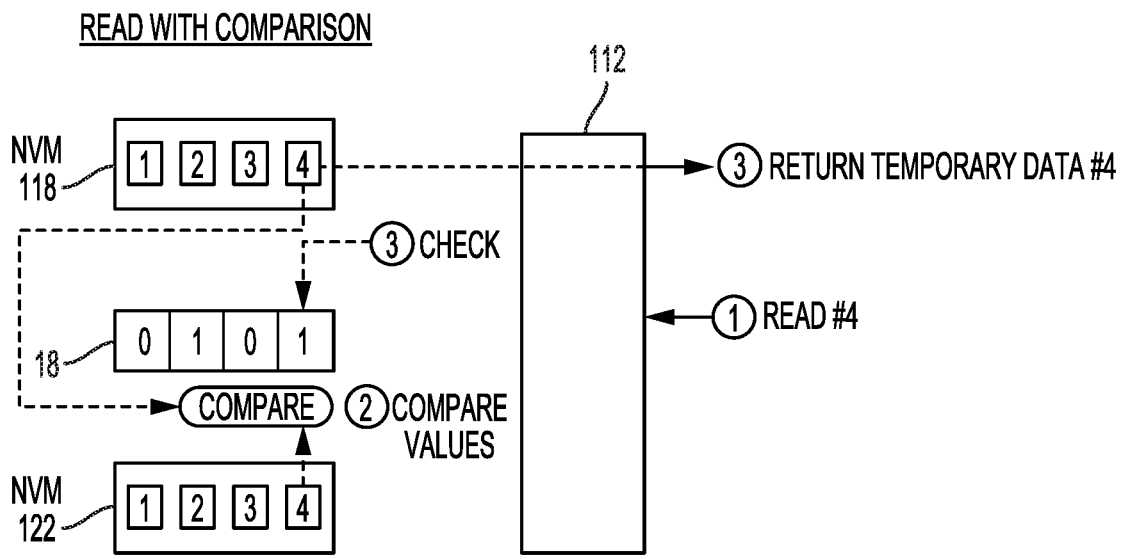
FIG. 7A depicts example read operations using a comparison of data stored in a first NVM array and a second NVM array according to an embodiment.

FIG. 7A depicts an example read operation using a comparison of data stored in NVM array 118 and NVM array 122 according to an embodiment. In the example of FIG. 7A, a read command is received for address #4. Unlike the example read operations in FIG. 6 discussed above, controller 112 does not check persistency data structure 14. Instead, controller 112 compares the data stored in NVM array 118 for address #4 with the data stored in NVM array 122 for address #4 to determine whether the data for address #4 is persistent. Although checking persistency data structure 14 may often be quicker than comparing the data stored for the address in the NVM arrays, some implementations may determine to compare data for the address due to a large size of persistency data structure 14.

Figure 7B:
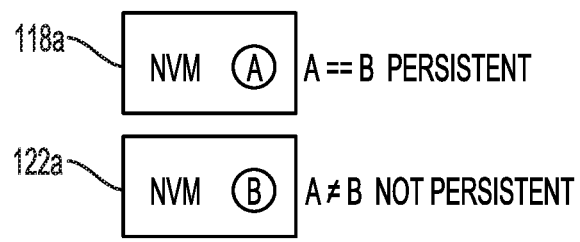
FIG. 7B illustrates a data persistency check according to an embodiment.

FIG. 7B illustrates a data persistency status check where the data for an address in NVM array 118 (i.e., data "A" stored at first location 118a) is compared to data for the address in NVM array 122 (data "B" stored at second location 122a). As shown in FIG. 7B, if the values for the data match (i.e., A==B), the data stored in NVM array 122 is considered persistent. If the values for the data do not match (i.e., A≠B), the data stored in NVM array 122 is not considered persistent.

Returning to the example read operation of FIG. 7A, controller 112 determines that the values for the data stored in the first location and in the second location for address #4 do not match, so the data stored for address #4 is not persistent data. Controller 112 then checks write data structure 18 to determine whether address #4 has been written since a last power-up. Since write data structure 18 indicates that address #4 has been written (i.e., a value of "1" for address #4), the data stored for address #4 is returned to CPU 101 from NVM array 118 for the read command.

Figure 8:
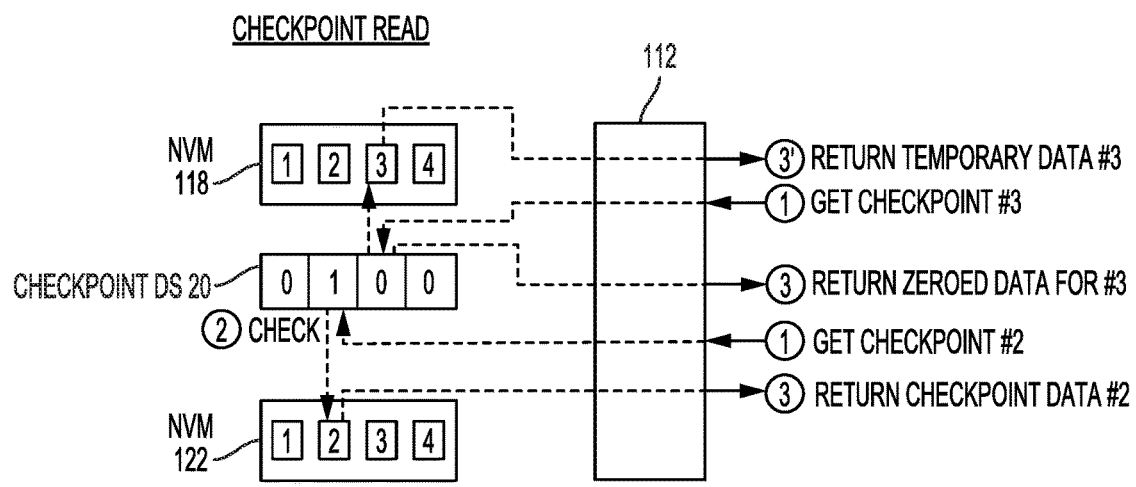
FIG. 8 depicts an example checkpoint read operation according to an embodiment.

FIG. 8 depicts an example checkpoint read operation according to an embodiment. In some implementations, MD 106 may be set by CPU 101 to a checkpoint mode, while in other implementations, CPU 101 may send a specific checkpoint read command (e.g., get checkpoint command) to MD 106 to request checkpointed data. The checkpoint mode can allow CPU 101 to request checkpointed data stored in configurable NVM 116.

In the example of FIG. 8, a read command for checkpointed data for address #2 is received from CPU 101, and controller 112 accesses checkpoint data structure 20 and persistency data structure 14 to determine whether the data for address #2 in NVM array 122 is checkpointed data. Since checkpoint data structure 20 indicates that the data for address #2 is checkpointed in NVM array 122 (i.e., a value of "1" for address #2), and persistency data structure 14 indicates that the data stored in NVM array 122 is not persistent, the data from the second location in NVM array 122 is returned to CPU 101 to complete the checkpoint read command.

In contrast, a read command to retrieve a checkpoint for address #3 is received from CPU 101, but controller 112 determines that the data for address #3 is not checkpointed in NVM array 122 (i.e., a value of "0" for address #3). Controller 112 then checks write data structure 18 to determine whether data has been written for address #3 since a last power-up of MD 106. If so, controller 112 returns data stored in the first location in NVM array 118 for address #3. If not, controller 112 returns zeroed data for the command. In other implementations, controller 112 may instead return an error indication or zeroed data if checkpoint data structure indicates that NVM array 122 does not store checkpointed data for the address.

Figure 9A:
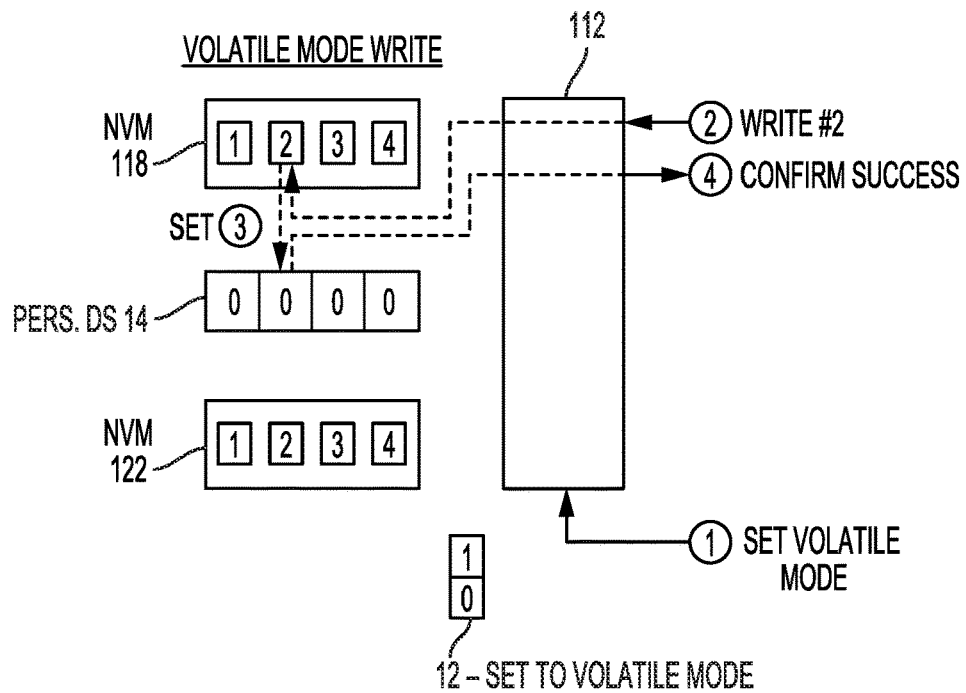
FIG. 9A depicts an example write operation during a volatile mode of an MD according to an embodiment.

FIG. 9A depicts an example write operation during a volatile mode of operation according to an embodiment. In the example of FIG. 9A, CPU 101 sets the volatility mode for MD 106 to the volatile mode. CPU 101 sends a write command for address #2 while MD 106 is in the volatile mode or may set the volatility mode with the write command for address #2. The data for the command is written to address #2 in the first location for address #2 in NVM array 118. The status indicated in persistency data structure 14 is then ensured to indicate that the data stored for address #2 is not persistent. In some cases, this includes changing or setting a value in persistency data structure 14 to a different value, such as from a "1" to a "0" as in the example of FIG. 9A. A confirmation of the success of the write command is then returned to CPU 101. Some implementations may not include a confirmation sent back to CPU 101, or may send an error back to CPU 101 indicating that the data was not written successfully if the data is not able to be written in NVM array 118.

In some implementations, the order of writing data, ensuring the persistency status in persistency data structure 14 for the address, or confirming the success of the write command back to CPU 101 may be different than in the example of FIG. 9A. For example, some implementations may first confirm the success of the write command and then ensure the status in persistency data structure 14, or may write the data and ensure the status at the same time.

In addition, CPU 101 in some implementations may be able to send a special write command to MD 106 indicating that a particular write command should be performed as a volatile write command or a persistent write command, regardless of the volatility mode set for MD 106. For example, CPU 101 may send a special "write volatile" command so that data is only written to the first memory location in NVM array 118 as in the volatile mode, even if the volatility mode set for MD 106. Controller 112 would then ensure that the persistency status for the written address in persistency data structure 14 indicates that the data for the address is not persistent.

Similarly, CPU 101 may send a special "write persistent" command so that data is written in both the first memory location in NVM array 118 and in the second memory location in NVM array 122 as in the persistent mode, even if MD 106 is set to a different mode, such as the volatile mode. Controller 112 would then ensure that the persistency status of the written address in persistency data structure 14 indicates that the data for address is persistent.

Figure 9B:
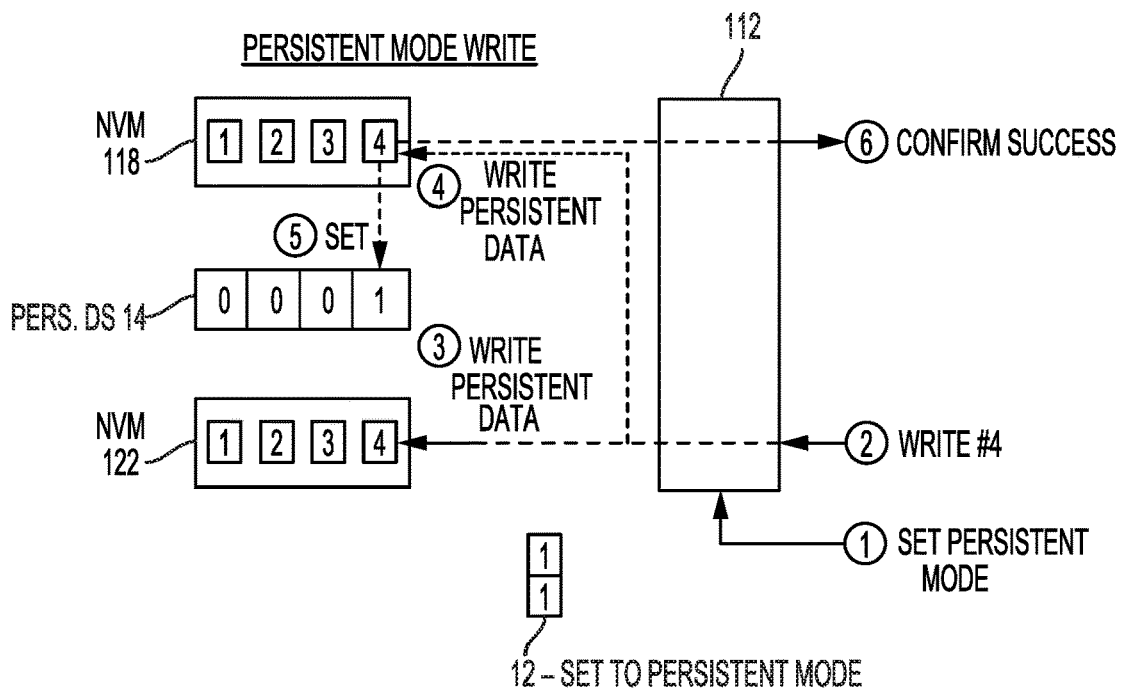
FIG. 9B depicts an example write operation during a persistent mode of an MD according to an embodiment.

FIG. 9B depicts an example write operation during the persistent mode according to an embodiment. In the example of FIG. 9B, CPU 101 defines a type for a write command for address #4 as non-volatile. CPU 101 sends a command to set the volatility mode of operation for MD 106 to a persistent mode. CPU 101 then sends a write command for address #4 while MD 106 is in the persistent mode. The data for the command is written to address #4 in both the first location for address #4 in NVM array 118, and in the second location for address #4 in NVM array 122.

The status for address #4 in persistency data structure 14 is then ensured to indicate that the data for address #4 is considered persistent in configurable NVM 116. This may include maintaining an indication of persistency in persistency data structure 14, or changing an indicator for address #4 in persistency data structure 14. A confirmation of the success of the write command is then returned to CPU 101. Some implementations may not include a confirmation sent back to CPU 101, or may send an error back to CPU 101 indicating that the data was not written successfully if the data is not able to be written to the second location in NVM array 122.

In some implementations, the order of writing data, ensuring the status in persistency data structure 14 for the address, or confirming the success of the write command back to CPU 101 may be different than in the example of FIG. 9B. For example, some implementations may first confirm the success of the write command, and then ensure the status in persistency data structure 14, or may write the data and ensure the status at the same time.

In addition, and as noted above, some implementations may allow CPU 101 to send a special command to MD 106 for a volatile write or a persistent write, regardless of a current volatility mode of MD 106. In such implementations, the current volatility mode may apply to subsequent received commands that are not sent as a special command.

Figure 9C:
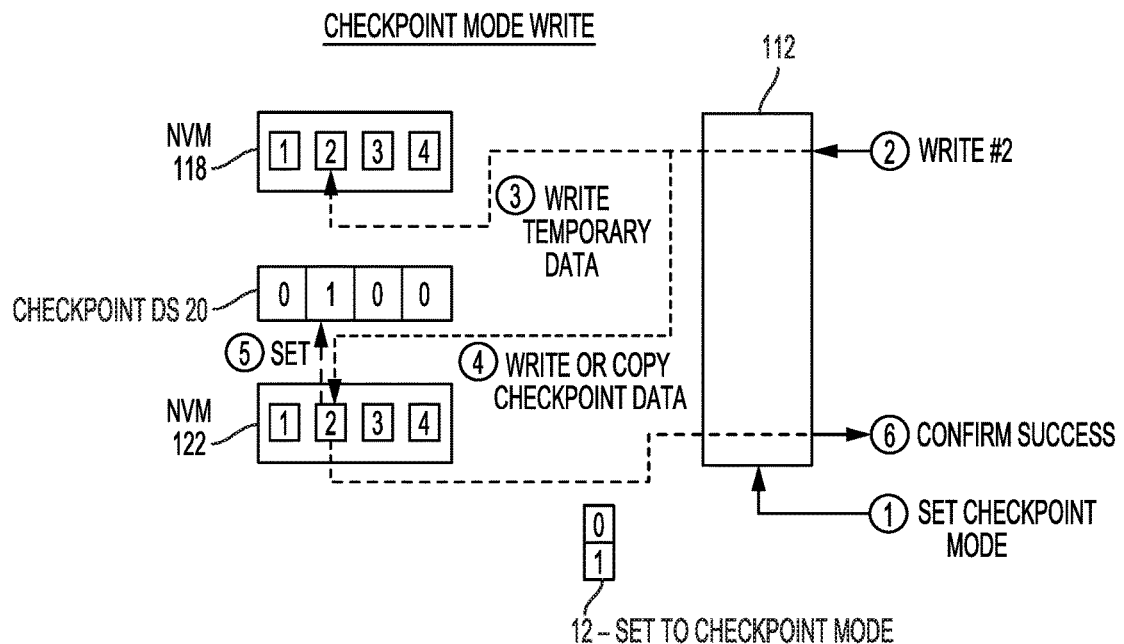
FIG. 9C depicts an example write operation during a checkpoint mode of an MD according to an embodiment.

FIG. 9C depicts an example write operation during the checkpoint mode according to an embodiment. In the example of FIG. 9C, a write command for address #2 is received when MD 106 is set to the checkpoint mode. MD 106 writes the data for the write command to the first location for address #2 in NVM array 118, and either writes or copies the data for the write command to the second location for address #2 in NVM array 122. In this regard, a checkpoint write command or a write command in the checkpoint mode may cause controller 112 to copy or checkpoint data from the first location to the second location, as discussed above for the example series of operations in FIG. 5. In another example, CPU 101 may only send a "checkpoint" command for a particular address, rather than a write command including new data to be written in the first location in NVM array 118. Controller 112 may then copy existing data from the first location in NVM array 118 to the second location in NVM array 122.

In the example of FIG. 9C, the status for address #2 in checkpoint data structure 20 is then ensured to indicate that the data for address #2 is considered checkpoint data in NVM array 122. This may include maintaining an indication in checkpoint data structure 20, or setting a different value of an indicator for address #2 in checkpoint data structure 20. A confirmation of the success of the checkpoint write command is then returned to CPU 101. Some implementations may not include a confirmation sent back to CPU 101, or may send an error back to CPU 101 indicating that the data was not written successfully if the data is not able to be written to the second location in NVM array 122.

In some implementations, the order of writing data, ensuring the status in checkpoint data structure 20 for the address, or confirming the success of the checkpoint write command back to CPU 101 may be different than in the example of FIG. 9C. For example, some implementations may first confirm the success of the write command and then ensure the status in checkpoint data structure 20, or may write the data and ensure the status at the same time.

Figure 10:
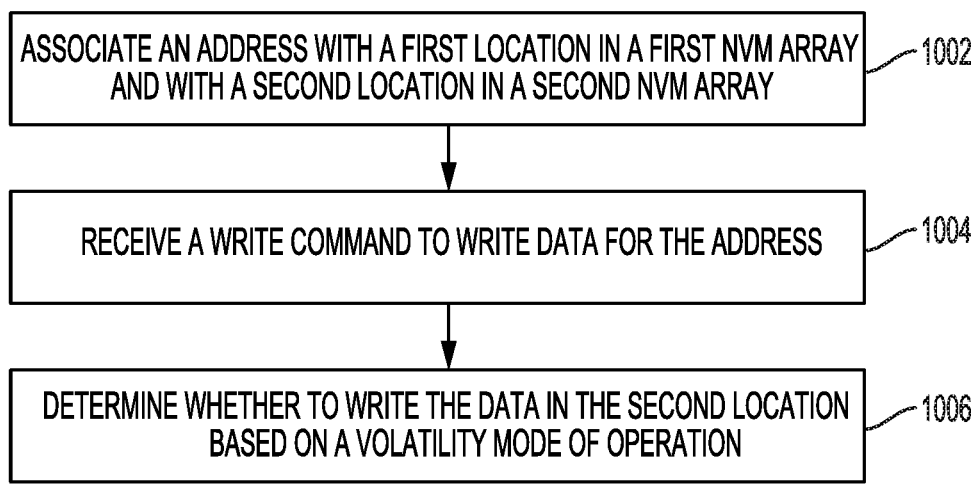
FIG. 10 is a flowchart for a data write process of an MD according to an embodiment.

FIG. 10 is a flowchart for a write process of an MD that can be performed by controller 112 executing MD firmware 16 according to an embodiment. In block 1002, controller 112 associates an address for data with a first location in a NVM array 118, and also associates the address with a second location in NVM array 122. The association may be performed as part of an initialization process of MD 106 before receiving any read or write commands from CPU 101. The association may be stored in an NVM of MD 106, such as in NVM 120. When CPU 101 boots-up or starts-up, CPU 101 may communicate with MD 106 to obtain a range or a plurality of addresses available for storing data in NVM arrays 118 and 122. Each address in the plurality of addresses can correspond to a first physical location in NVM array 118 for storing temporary data, and also correspond to a second physical location in NVM array 122 for storing checkpointed or persistent data.

In block 1004, MD 106 receives a write command to write data for the address associated with the first location and the second location in block 1002. As discussed above, the command may also include a setting for a volatility mode of operation for MD 106, such as a volatile mode, a persistent mode, or a checkpoint mode. In some cases, CPU 101 may not specify a volatility mode, such as when a previously set volatility mode is to be used for the write command received in block 1004, when a separate command from CPU 101 sets the volatility mode, or when MD 106 is operating in a default mode or in the null mode.

In block 1006, controller 112 determines whether to write the data in the second location to perform the command based on the volatility mode of operation currently set for MD 106.

Figure 11A:
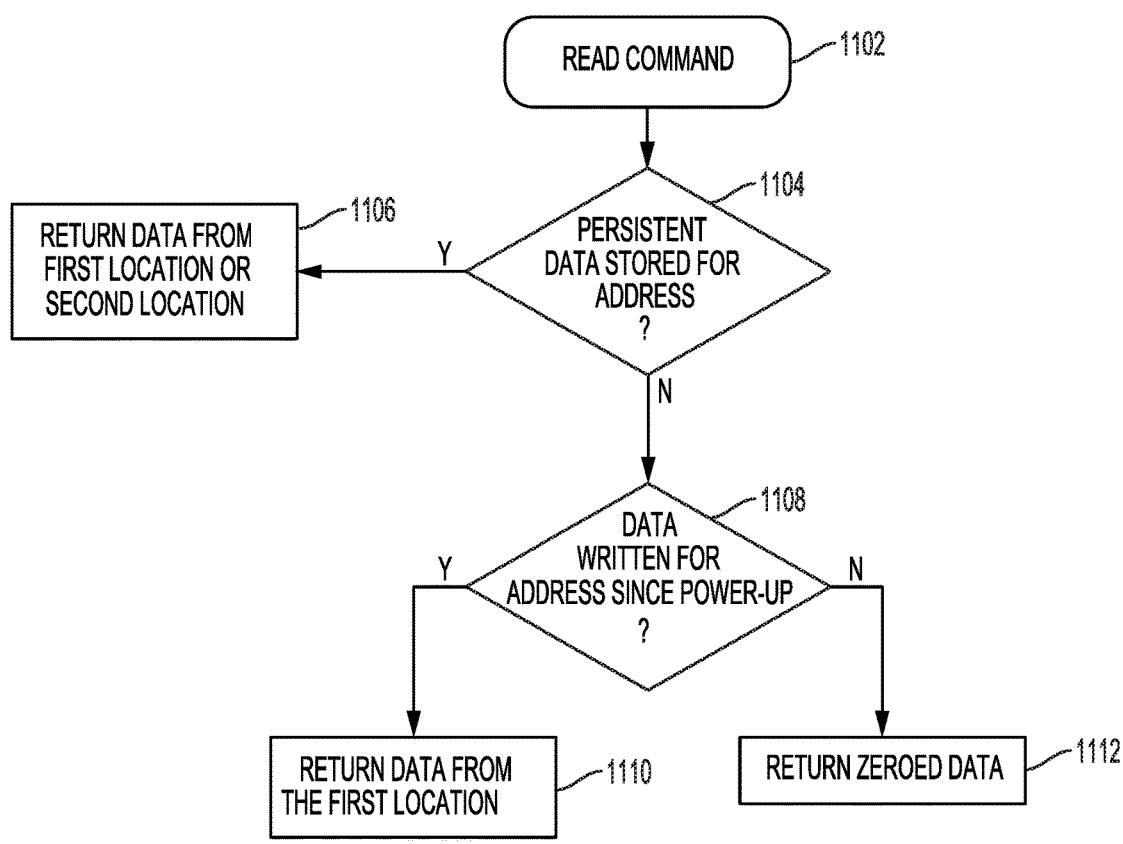
FIG. 11A is a flowchart for a read process of an MD according to an embodiment.

FIG. 11A is a flowchart for a read process of MD 106 that can be performed by controller 112 executing MD firmware 16 according to an embodiment. As shown in FIG. 11A, a read command is received by controller 112 in block 1102.

In block 1104, controller 112 determines whether data stored in configurable NVM 116 is persistent for an address associated with the read command. This can include, for example, checking persistency data structure 14 for the address or comparing the data stored in each of NVM array 118 and NVM array 122 for the address, as discussed above with reference to FIG. 7B.

If it is determined that the data stored in configurable NVM 116 is persistent, controller 112 returns data for the address stored in either the first location in NVM array 118 or in the second location in NVM array 122. As noted above, when data is persistent in configurable NVM 116, the values for the data stored in the first location and in the second location should match, so either location may be accessed for performing a read command when the data is persistent.

If it is determined that the data is not persistent for the address, controller 112 in block 1108 determines whether data has been previously written for the address since a last power-up of MD 106. Controller 112 may check write data structure 18 to determine whether data for the address has been written. If so, controller 112 in block 1110 returns data from the first location to perform the read command. On the other hand, if data for the address has not been written since a last power-up, zeroed data is returned to perform the read command. In other implementations, a different predetermined data pattern, such as an additional error bit or indicator, may be returned instead of zeroed data.

Figure 11B:
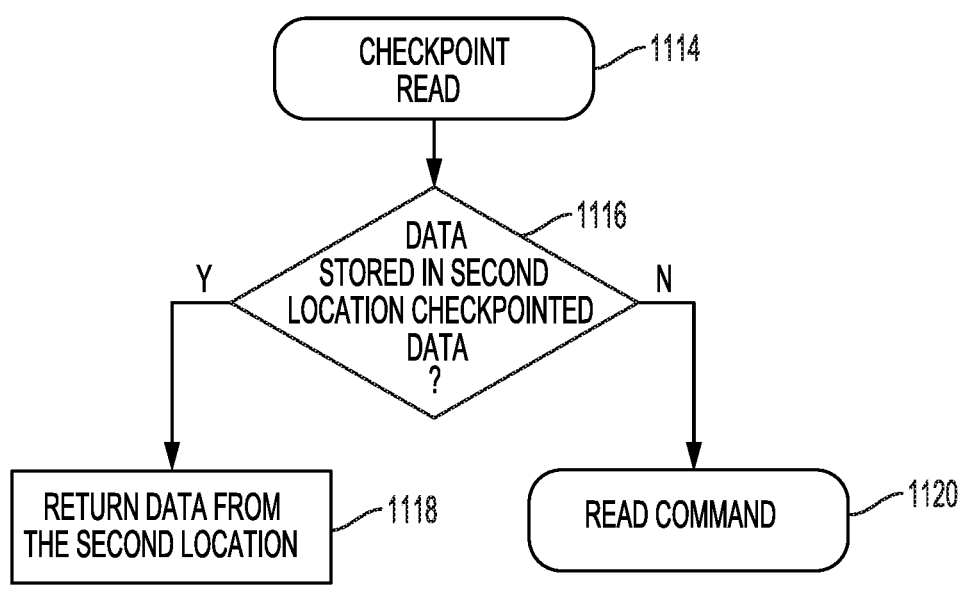
FIG. 11B is a flowchart for a checkpoint read process of an MD according to an embodiment.

FIG. 11B is a flowchart for a checkpoint read process that can be performed by controller 112 executing MD firmware 16 according to an embodiment. In block 1114, MD 106 receives a checkpoint read command requesting the checkpoint for a particular address, or MD 106 receives a read command for an address when MD 106 is already set in the checkpoint mode. In other implementations, the checkpoint command received in block 1114 may be a special checkpoint command to request checkpointed data for a particular address, without considering a current volatility mode of MD 106.

Controller 112 determines in block 1120 whether the data stored in the second location in NVM array 122 for the address is considered checkpointed. This may be determined with reference to checkpoint data structure 20, as discussed above.

If it is determined that the data stored in the second memory location is considered checkpointed, this data is returned to CPU 101 in block 1118 to perform the checkpoint read command. On the other hand, if it is determined that the data stored in the second memory location is not considered checkpointed, controller 112 in block 1120 may treat the checkpoint read command as an ordinary read command by, for example, performing the read process described above for FIG. 11A. In other words, controller 112 may return zeroed data, another predetermined data pattern, or data accessed from the first memory location to complete the checkpoint read command based on whether data for the requested address has been written since a last power-up of MD 106. In other implementations, controller 112 may instead return an error or a predetermined data pattern in block 1120 if data for the address has not been checkpointed in NVM array 122.

FIG. 12A is a flowchart for a volatile mode write process that can be performed by controller 112 executing MD firmware 16 according to an embodiment. In block 1202, a write command is received from CPU 101 when MD 106 is set to the volatile mode. The volatile mode may be set with the command, with a separate command, or may have been previously set for an earlier command.

In block 1204, controller 112 writes data in the first location in NVM array 118 without writing data for the command in the second location in NVM array 122. Controller 112 then ensures in block 1205 that the persistency status for the address in persistency data structure 14 indicates that the data stored for the address in NVM array 122 is not considered persistent. As discussed above, this may involve setting a different value in persistency data structure 14 to indicate that the data is not considered persistent, or verifying that the value in persistency data structure already indicates that the data is not considered persistent. In other implementations where MD 106 relies only on a comparison between data stored in NVM array 118 and NVM array 122 to determine a persistency status, persistency data structure 14 may be omitted such that block 1205 need not be performed.

FIG. 12B is a flowchart for a persistent mode write process that can be performed by controller 112 executing MD firmware 16 according to an embodiment. In block 1206, a write command is received when MD 106 is set to a persistent mode. The persistent mode may have been set with the received command, with a separate command, or may have been previously set for an earlier command.

In block 1208, controller 112 writes data for the command in both the first location in NVM array 118 and in the second location in NVM array 122. The data written in the second location is then considered persistent since it matches the data stored in the first location. In block 1210, controller 112 ensures that an indication in persistency data structure 14 stored in NVM 120 indicates that the second location stores data considered persistent. In some cases, the status in persistency data structure 14 may remain the same if it already indicates that the data stored in the second location is considered persistent. In other cases, controller 112 may need to modify or set the indication if persistency data structure 14 does not already indicate that the data stored in the second location is considered persistent. In other implementations where MD 106 relies only on a comparison between data stored in NVM array 118 and NVM array 122 to determine a persistency status, persistency data structure 14 may be omitted such that block 1210 need not be performed.

FIG. 12C is a flowchart for a checkpoint mode write process that can be performed by controller 112 executing MD firmware 16 according to an embodiment. In block 1212, a write command is received from CPU 101 when MD 106 is set in the checkpoint mode. In some cases, the checkpoint mode may be set with the received command, with a separate command, or may have been previously set for another command to access data stored in MD 106.

In block 1214, controller 112 writes data for the command in both the first location in NVM array 118 and in the second location in NVM array 122. In block 1210, controller 112 ensures that an indication in checkpoint data structure 20 stored in NVM 120 indicates that the second location stores data considered checkpointed. In some cases, the status in checkpoint data structure 20 may remain the same if it already indicates that the data stored in the second location is considered checkpointed. In other cases, controller 112 may need to modify or set the indication if checkpoint data structure 20 does not already indicate that the data stored in the second location is considered checkpointed.

As discussed above, accessing data in a first NVM location and/or a second NVM location based on a volatility mode can provide a dual use of configurable NVM 116 in MD 106 for accessing data considered temporary, and for accessing data considered persistent. This ordinarily allows systems to take advantage of the faster access speeds of more recent and developing NVM technologies by removing one or more levels of volatile memory components between an NVM and a processor's caches, while still managing the temporary and persistent nature of data used by the processor. In addition, the use of NVM to store temporary data in place of conventional volatile memory can reduce power usage by not needing to refresh the volatile memory.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, an SoC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Memory Device (MD), comprising:
 a configurable Non-Volatile Memory (NVM) including a first memory array and a second memory array for storing data, wherein the configurable NVM is configured to store temporary data designated for volatile storage by a Central Processing Unit (CPU) and persistent data designated for non-volatile storage by the CPU; and
 a controller configured to:
  associate an address with a first location in the first memory array and with a second location in the second memory array;
  receive a read command to read data from the configurable NVM for the address;
  determine whether data stored in the configurable NVM for the address indicates that the data is persistent;
  in response to determining that the data stored in the configurable NVM for the address is not persistent, perform the read command by returning zeroed data or by returning data stored in the first location, wherein zeroed data is returned when data for the address has not been written since power-up of the MD and data stored in the first location is returned when data for the address has been written since power-up of the MD; and
  in response to determining that the data stored in the configurable NVM for the address is persistent, perform the read command by returning the data stored in the configurable NVM for the address from either the first location or the second location.

2. The MD of claim 1, wherein when a volatility mode of operation for the MD is set to a volatile mode, the controller is further configured to write data for a write command in the first location without writing the data in the second location.

3. The MD of claim 2, wherein the controller is further configured to ensure that an indication in a persistency data structure stored in an NVM location of the MD indicates that the configurable NVM does not store persistent data for a corresponding address after performing the write command.

4. The MD of claim 1, wherein when a volatility mode of operation for the MD is set to a persistent mode, the controller is further configured to write data for a write command in both the first location and the second location.

5. The MD of claim 4, wherein the controller is further configured to ensure that an indication in a persistency data structure stored in an NVM location of the MD indicates that the configurable NVM stores persistent data for a corresponding address after performing the write command.

6. The MD of claim 1, wherein the controller is further configured to determine whether the data stored in the configurable NVM for the address is persistent by checking a persistency data structure stored in an NVM location of the MD or by comparing data stored in the first location with data stored in the second location.

7. The MD of claim 1, wherein the controller is further configured to:
 receive a checkpoint read command to retrieve checkpointed data for the address;
 determine whether data stored in the second location is checkpointed data;

in response to determining that the data stored in the second location is checkpointed data, perform the checkpoint read command by returning the checkpointed data from the second location; and in response to determining that the data stored in the second location is not checkpointed data, perform the checkpoint read command by returning zeroed data or data stored in the first location based on whether data for the address has been written since power-up of the MD.

8. The MD of claim 7, wherein the controller is further configured to determine whether the data stored in the second location is checkpointed data by checking a checkpoint data structure stored in an NVM location of the MD.

9. A Central Processing Unit (CPU), comprising:
an interface for communicating with a Memory Device (MD) that includes a configurable Non-Volatile Memory (NVM) configured to store temporary data designated for volatile storage and persistent data designated for non-volatile storage; and
a processor configured to:
designate a memory page in a virtual memory space as volatile or non-volatile based on data allocated to the memory page;
define a volatility mode of operation for the MD based on whether the memory page is designated as volatile or non-volatile; and
send a write command to the MD to write the data allocated to the memory page in the configurable NVM, wherein the defined volatility mode of operation is used by the MD to determine whether to write the data as persistent data in both a first memory array of the configurable NVM and a second memory array of the configurable NVM or to write the data as volatile data in the first memory array without writing the data in the second memory array; and
send a read command to the MD to read the data from the configurable NVM, wherein zeroed data is returned for the read command when the data has been written as volatile data and has not been written since power-up of the MD, data stored in the first memory array is returned for the read command when the data has been written as volatile data since power-up of the MD, and data is returned from either the first memory array or the second memory array for the read command when the data has been written as persistent data.

10. The CPU of claim 9, wherein the processor is further configured to set the defined volatility mode of operation for the MD by sending a separate volatility mode command to the MD or by including an indication of the defined volatility mode with the command.

11. The CPU of claim 9, wherein the processor is further configured to send to the MD at least one of a checkpoint command to copy data within the configurable NVM and a checkpoint read command to retrieve checkpointed data from the configurable NVM.

12. A method of operating a Memory Device (MD), the method comprising:
associating an address with a first location in a first memory array of a configurable Non-Volatile Memory (NVM) of the MD and with a second location in a second memory array of the configurable NVM, wherein the configurable NVM is configured to store temporary data designated for volatile storage by a Central Processing Unit (CPU) and persistent data designated for non-volatile storage by the CPU;
receiving a read command to read data from the configurable NVM for the address;
determining whether data stored in the configurable NVM for the address indicates that the data is persistent;
in response to determining that the data stored in the configurable NVM for the address is not persistent, performing the read command by returning zeroed data or by returning data stored in the first location, wherein zeroed data is returned when data for the address has not been written since power-up of the MD and data stored in the first location is returned when data for the address has been written since power-up of the MD; and
in response to determining that the data stored in the configurable NVM for the address is persistent, performing the read command by returning the data stored in the configurable NVM for the address from either the first location or the second location.

13. The method of claim 12, wherein when a volatility mode of operation for the MD is set to a volatile mode, the method further comprises writing data for a write command in the first location without writing the data in the second location.

14. The method of claim 13, wherein the method further comprises ensuring that an indication in a persistency data structure stored in an NVM location of the MD indicates that the configurable NVM does not store persistent data for a corresponding address after performing the write command.

15. The method of claim 12, wherein when a volatility mode of operation for the MD is set to a persistent mode, the method further comprises writing data for a write command in both the first location and the second location.

16. The method of claim 15, wherein the method further comprises ensuring that an indication in a persistency data structure stored in an NVM location of the MD indicates that the configurable NVM stores persistent data for a corresponding address after performing the write command.

17. The method of claim 12, further comprising determining whether the data stored in the configurable NVM for the address is persistent by checking a persistency data structure stored in an NVM location of the MD or by comparing data stored in the first location with data stored in the second location.

18. The method of claim 12, further comprising:
receiving a checkpoint read command to retrieve checkpointed data for the address;
determining whether data stored in the second location is checkpointed data;
in response to determining that the data stored in the second location is checkpointed data, performing the checkpoint read command by returning the checkpointed data from the second location; and
in response to determining that the data stored in the second location is not checkpointed data, performing the checkpoint read command by returning zeroed data or data stored in the first location based on whether data for the address has been written since power-up of the MD.

19. The method of claim 18, further comprising determining whether the data stored in the second location is checkpointed data by checking a checkpoint data structure stored in an NVM location of the MD.

20. A method of operating a Central Processing Unit (CPU), the method comprising:

designating a memory page in a virtual memory space as volatile or non-volatile based on data allocated to the memory page;

defining a volatility mode of operation for a Memory Device (MD) based on whether the memory page is designated as volatile or non-volatile, wherein the MD includes a configurable Non-Volatile Memory (NVM) configured to store temporary data designated for volatile storage and persistent data designated for non-volatile storage;

sending a write command to the MD to write the data allocated to the memory page in the configurable NVM, wherein the defined volatility mode of operation is used by the MD to determine whether to write the data as persistent data in both a first memory array of the configurable NVM and a second memory array of the configurable NVM or to write the data as volatile data in the first memory array without writing the data in the second memory array; and sending a read command to the MD to read the data from the configurable NVM, wherein zeroed data is returned for the read command when the data has been written as volatile data and has not been written since power-up of the MD, data stored in the first memory array is returned for the read command when the data has been written as volatile data since power-up of the MD, and data is returned from either the first memory array or the second memory array for the read command when the data has been written as persistent data.

21. The method of claim 20, further comprising setting the defined volatility mode of operation for the MD by sending a separate volatility mode command to the MD or by including an indication of the defined volatility mode with the command.

22. The method of claim 20, further comprising sending to the MD at least one of a checkpoint command to copy data within the configurable NVM and a checkpoint read command to retrieve checkpointed data from the configurable NVM.

23. A non-transitory computer readable medium storing computer-executable instructions, wherein when the computer-executable instructions are executed by a controller of a Memory Device (MD), the computer-executable instructions cause the controller to:

associate an address with a first location in a first memory array of a configurable Non-Volatile Memory (NVM) of the MD and with a second location in a second memory array of the configurable NVM, wherein the configurable NVM is configured to store temporary data designated for volatile storage by a Central Processing Unit (CPU) and persistent data designated for non-volatile storage by the CPU;

receive a read command to read data from the configurable NVM for the address;

determine whether data stored in the configurable NVM for the address indicates that the data is persistent;

in response to determining that the data stored in the configurable NVM for the address is not persistent, perform the read command by returning zeroed data or by returning data stored in the first location, wherein zeroed data is returned when data for the address has not been written since power-up of the MD and data stored in the first location is returned when data for the address has been written since power-up of the MD; and in response to determining that the data stored in the configurable NVM for the address is persistent, perform the read command by returning the data stored in the configurable NVM for the address from either the first location or the second location.

24. A non-transitory computer readable medium storing computer-executable instructions, wherein when the computer-executable instructions are executed by a processor of a Central Processing Unit (CPU), the computer-executable instructions cause the processor to:

designate a memory page in a virtual memory space as volatile or non-volatile based on data allocated to the memory page;

define a volatility mode of operation for a Memory Device (MD) based on whether the memory page is designated as volatile or non-volatile, wherein the MD includes a configurable Non-Volatile Memory (NVM) configured to store temporary data designated for volatile storage and persistent data designated for non-volatile storage;

send a write command to the MD to write the data allocated to the memory page in the configurable NVM, wherein the defined volatility mode of operation is used by the MD to determine whether to write the data as persistent data in both a first memory array of the configurable NVM and a second memory array of the configurable NVM or to write the data as volatile data in the first memory array without writing the data in the second memory array; and send a read command to the MD to read the data from the configurable NVM, wherein zeroed data is returned for the read command when the data has been written as volatile data and has not been written since power-up of the MD, data stored in the first memory array is returned for the read command when the data has been written as volatile data since power-up of the MD, and data is returned from either the first memory array or the second memory array for the read command when the data has been written as persistent data.

25. A Memory Device (MD), comprising:

a configurable Non-Volatile Memory (NVM) including a first memory array and a second memory array for storing data, wherein the configurable NVM is configured to store temporary data designated for volatile storage by a Central Processing Unit (CPU) and persistent data designated for non-volatile storage by the CPU; and a controller configured to:
  associate an address with a first location in the first memory array and with a second location in the second memory array;
  receive a checkpoint read command to retrieve checkpointed data for the address;
  determine whether data stored in the second location is checkpointed data;
  in response to determining that the data stored in the second location is checkpointed data, perform the checkpoint read command by returning the checkpointed data from the second location; and
  in response to determining that the data stored in the second location is not checkpointed data, perform the checkpoint read command by returning zeroed data or data stored in the first location based on whether data for the address has been written since power-up of the MD.

* * * * *